United States Patent
Pappakrishnan et al.

(10) Patent No.: US 12,524,416 B1
(45) Date of Patent: Jan. 13, 2026

(54) QUERY RESPONSE SYSTEM IMPLEMENTING A RETRIEVAL-AUGMENT GENERATION ARCHITECTURE

(71) Applicant: Palo Alto Networks, Inc., Santa Clara, CA (US)

(72) Inventors: Venkatesh K Pappakrishnan, Dublin, CA (US); Praveen Herur, Fremont, CA (US); Alok Tongaonkar, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/767,729

(22) Filed: Jul. 9, 2024

(51) Int. Cl.
| | | |
|---|---|---|
| G06F 7/02 | (2006.01) | |
| G06F 16/00 | (2019.01) | |
| G06F 16/242 | (2019.01) | |
| G06F 16/2457 | (2019.01) | |
| G06F 16/3329 | (2025.01) | |
| G06F 16/93 | (2019.01) | |
| G06F 16/2452 | (2019.01) | |
| G06N 7/04 | (2006.01) | |
| G06N 20/00 | (2019.01) | |

(52) U.S. Cl.
CPC ...... *G06F 16/24578* (2019.01); *G06F 16/243* (2019.01); *G06F 16/33295* (2025.01); *G06F 16/93* (2019.01); *G06F 16/24522* (2019.01); *G06N 7/046* (2013.01); *G06N 20/00* (2019.01)

(58) Field of Classification Search
CPC .. G06F 16/24578; G06F 16/93; G06F 16/243; G06F 16/24522; G06F 16/33295; G06F 16/90332; G06N 20/00; G06N 7/046
See application file for complete search history.

(56) References Cited

U.S. PATENT DOCUMENTS

| | | | |
|---|---|---|---|
| 12,282,504 B1 * | 4/2025 | Ganesh | G06F 16/35 |
| 2025/0147894 A1 * | 5/2025 | Benisty | G06F 12/123 |
| 2025/0252265 A1 * | 8/2025 | Kotte | G06F 40/35 |
| 2025/0259075 A1 * | 8/2025 | Crabtree | G06N 3/092 |
| 2025/0291768 A1 * | 9/2025 | Vinodkumar | G06F 16/1734 |

OTHER PUBLICATIONS

Gao, Yunfan et al, "Retrieval-Augmented Generation for Large Language Models: A Survey," Mar. 27, 2024, ArXiv, retrieved May 14, 2025 from https://www.semanticscholar.org/paper/Retrieval-Augmented-Generation-for-Large-Language-A-Gao-Xiong/46f9f7b8f88f72e12cbdb21e3311f995eb6e65c5 (Year: 2024).*

Roy, Dwaipayan, "Representing Documents and Queries as Sets of Word Embedded Vectors for Information Retrieval," SIGIR Workshop on Information Retrieval, 2016. (Year: 2016).*

* cited by examiner

*Primary Examiner* — Bruce M Moser
(74) *Attorney, Agent, or Firm* — Van Pelt, Yi & James LLP (57) ABSTRACT

A query is received from a client device. A subset of documents relevant to the query is determined in part by determining an optimal configuration for the query. The subset of documents is inputted in a context window for a response generator and the query is inputted as a prompt for a query response. The query response received from the response generator is outputted to the client device.

17 Claims, 5 Drawing Sheets

QUERY RESPONSE SYSTEM IMPLEMENTING A RETRIEVAL-AUGMENT GENERATION ARCHITECTURE

BACKGROUND OF THE INVENTION

Large Language Models (LLMs) are typically trained on publicly available documents. As a result, they may struggle to answer domain-specific questions if such documents were not included in their training data. Retrieval-Augmented Generation (RAG) is an architecture used for knowledge-based question answering, particularly useful when the required data was not part of the model's training set.

RAG can reduce the likelihood of hallucination in LLM responses, though it does not eliminate them entirely. There are several potential failure points in a RAG-based approach that can impact the reliability of the responses. For example, if irrelevant or conflicting documents are retrieved, it may cause the LLM to generate hallucinated responses. Additionally, the absence of relevant documents can also lead to hallucinations in the LLM response.

BRIEF DESCRIPTION OF THE DRA WINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An enhanced RAG architecture to achieve higher accuracy and reliability in RAG-based LLM applications is disclosed herein. The disclosed architecture reduces the hallucinations generated by an LLM in a query response to zero or near-zero, and causes the LLM to generate highly accurate query responses. The disclosed architecture is highly reliable for consistently generating accurate responses. In some embodiments, the disclosed architecture is implemented as a customer chatbot to address common queries using public documents. In some embodiments, the disclosed architecture is implemented for customer support to internally resolve specific issues and questions.

A query is received from a client device at a query response system implementing the enhanced RAG architecture. The query response system includes a query augmentor to collect sufficient details from a user associated with the client device to accurately retrieve documents to answer the query. The query augmentor asks the user associated with the client device one or more follow up questions until sufficient information is collected. In some embodiments, sufficient information is collected when a relevant document can be retrieved to answer the query. In some embodiments, sufficient information is collected when the retrieved information does not include conflicting information, which may cause a hallucination. The query augmentor combines the one or more follow up questions and responses to render a query with specific details.

The query augmentor summarizes the query into a simple format. The query may be comprised of a long complex question. Summarizing the query into a simple format and utilizing the summarized query to generate the query response may yield a better query response when compared to performing the query with the long complex question.

For example, the query received from the client device may be "What is Prisma Cloud?" A first follow-up question may be "Great! Do you want to know anything specific about Prisma Cloud?" A first follow-up response may be "Yes. Policies supported in Prisma Cloud." A second follow-up question may be "Sure. Do you have any specific policy that you are interested in?" A second follow-up response "Does Prisma Cloud have a policy to cryptojacking? If yes, I would like to know more about it." The query response system may end the conversion with a response of "Sounds good." This indicates that the query response system has sufficient information to answer the query. The query response system may summarize the query as "What are the details of the cryptojacking policy in Prisma Cloud?"

The query response system further includes a query configurator. The query configurator receives the summarized query from the query augmentor and determines a category associated with the summarized query (e.g., type of question) from a plurality of known categories. Weights are assigned to documents based on the determined category associated with the summarized query. Weights may be assigned during a search for a set of documents or after a search has returned a set of documents. This helps identifying relevant documents to answer the query. For example, for an issue resolution type question, knowledge base articles and frequently asked questions (FAQS) from a customer engineering team may weigh more when compared to other types of documents. Similarly, for a policy-related question, policy documents weigh more when compared to other types of documents.

The query response system further includes a document identifier. The document identifier determines from a set of documents a best possible combination of documents to answer the query. In some embodiments, documents are removed from the set of documents based on the determined category associated with the summarized query (e.g., documents that are different category). The document identifier generates each possible combination of documents (from the set of documents or filtered set of documents) and provides each possible combination of documents with the summarized query to the response generator. The document identifier asks the response generator if it can answer the summarized query given a particular combination of documents. For each combination of documents provided to the response generator, the document identifier scores each document based on whether the response generator outputs a positive response (e.g., yes) or a negative response (e.g., no). A document score for a document is an aggregated score for all possible combination of documents.

For example, a first combination of documents may include document 1, document 2, and document 3. A second combination of documents may include document 1, document 5, and document 6. A third combination of documents may include document 2 and document 5. The response generator may indicate that it can answer the summarized query with a combination of document 1, document 2, and document 3. As a result, the aggregated score for document 1, document 2, and document 3 would be 1, 1, and 1, respectively. The response generator may indicate that it cannot answer the summarized query with a combination of document 1, document 5, and document 6. As a result, the aggregated score for document 1, document 2, document 3, document 5, and document 6 would be 0, 1, 1, −1, and −1, respectively. The response generator may indicate that it cannot answer the summarized query with a combination of document 2 and document 5. As a result, the aggregated score for document 1, document 2, document 3, document 5, and document 6 would be 0, 0, 1, −2, and −1, respectively.

After each possible combination of documents is evaluated, the documents are ranked. The document rankings are adjusted by the query configurator based on the weights associated with a document category. In some embodiments, the weight associated with a document increases the ranking of the document within the document ranking. In some embodiments, the weight associated with a document reduces the ranking of the document within the document ranking. In some embodiments, the weight associated with a document maintains the ranking of the document within the document ranking.

The document identifier identifies a subset of the plurality of documents that will be used to generate the query response. In some embodiments, documents included in the subset have a score greater than or equal to a threshold score. In some embodiments, documents included in the subset having a ranking score above a ranking threshold (e.g., top ten). In some embodiments, documents included in the subset have a percentage ranking above a ranking percentage (e.g., top 5%).

The summarized query and the subset of the plurality of documents is provided from the query response system to a response generator (e.g., large language model). The response generator generates the query response based on the summarized query and the subset of the plurality of documents and provides the query response to the query response system. The query response system provides the query response to the client device.

Figure 1:
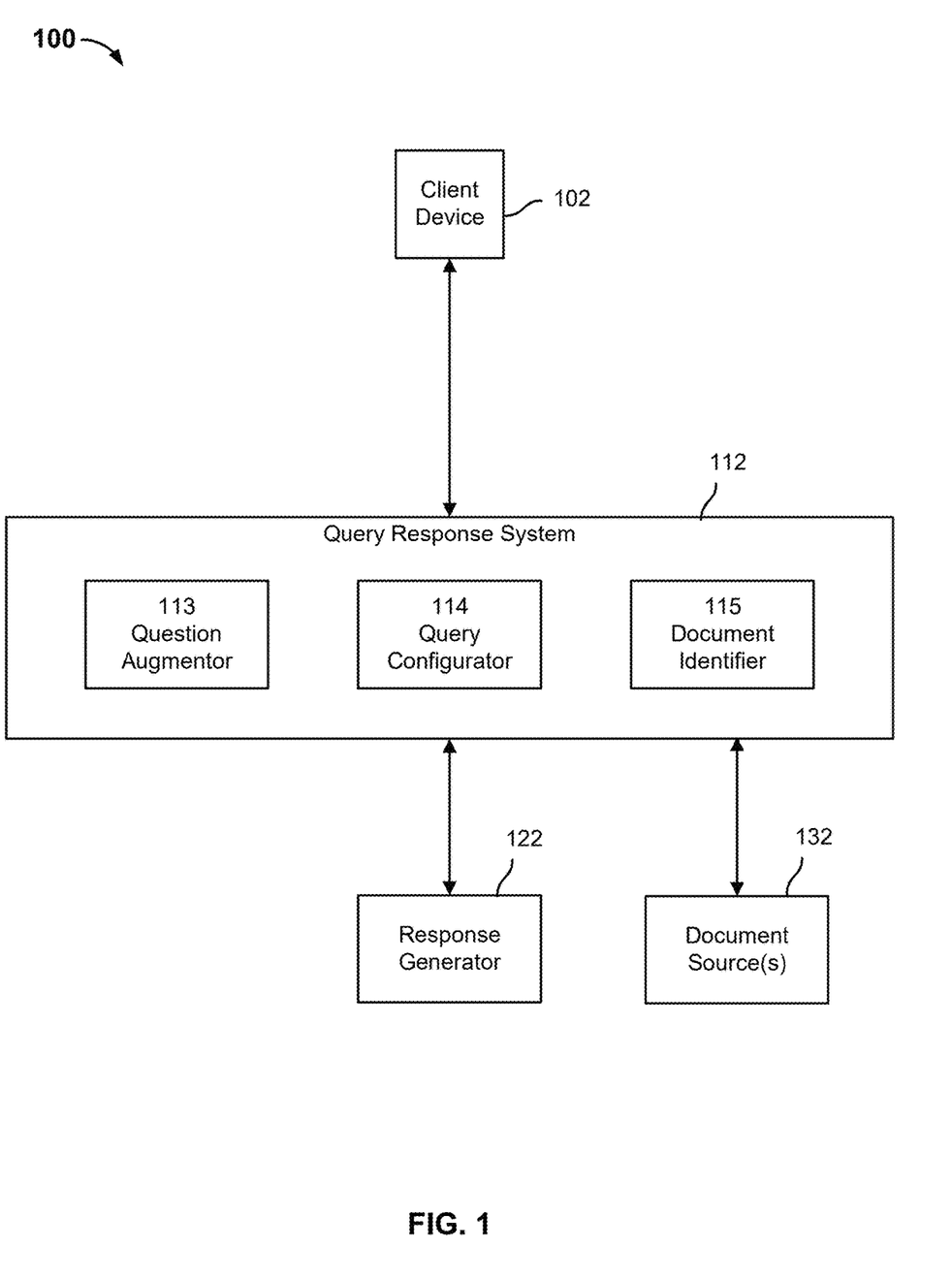
FIG. 1 is a block diagram illustrating a system to generate a query response in accordance with some embodiments.

FIG. 1 is a block diagram illustrating a system to generate a query response in accordance with some embodiments. In the example shown, system 100 includes client device 102 configured to communicate with query response system 112 via a connection (wireless or wired). Client device 102 may be a server, a computer, a laptop, a desktop, a tablet, a smartphone, a cell phone, a vehicle, or any other electronic device capable of sending a query to query response system 112.

Query response system 112 may be comprised of one or more servers, one or more computers, one or more virtual machines running on one or more computers, one or more containers running across one or more computers, and/or a combination thereof.

Client device 102 provides a query to query response system 112. Query augmentor 113 determines whether the query includes sufficient details necessary to answer the query. Query augmentor 113 provides the query to response generator 122 and asks it whether the query includes sufficient details necessary to answer the query.

Response generator 122 may be a large language model (e.g., Azure OpenAI, OpenAI, Google Gemini, Anthropic, etc.). In some embodiments, response generator 122 is a public LLM. In some embodiments, response generator 122 is a private LLM. In some embodiments, response generator 122 is a hybrid LLM.

In some embodiments, response generator 122 is capable of answering the initial query provided by client device 102 and provides to query augmentor 113 a notification that a query response can be generated. In response, query augmentor 113 summarizes the query.

In some embodiments, response generator 122 is not capable of answering the initial query provided by client device 102 and provides to query augmentor 102 a notification that a query response cannot be generated. In response, query augmentor 102 is configured to request a user associated with client device 102 to provide additional contextual information associated with the query. For example, query augmentor 102 asks the user associated with the client device one or more follow up questions. With each received response, query augmentor 102 asks response generator 122 if it can answer the query given the additional contextual information. The process continues until response generator 122 indicates that it can answer the initial query given the additional contextual information. In response, query augmentor 113 summarizes the query.

The summarized query is provided to query configurator 114. Query configurator 114 is configured to configure the query in a manner that assists in obtaining suitable documents to be used in answering the query. Query configurator 114 is configured to classify the summarized query into one of many known query categories using a classification model, such as a large language model or embedding model. Examples of query categories include, but are not limited to: general product related, issue resolution, competitive, policy, API usage, etc.

Query configurator 114 is configured to determine the query category by converting the summarized query into an embedding vector. Query configurator 114 may utilize a natural language processor to generate the embedding vector. Query configurator 114 is configured to determine a stored query that is most similar to the summarized query by providing the embedding vector associated with the summarized query to an embedding model (e.g., Ada, Gecko, etc.). Embedding vectors associated with a plurality of stored queries may be located in a plurality of different positions in the embedding space. In some embodiments, the embedding model is configured to determine a stored query that is most similar to the summarized query by determine an embedding vector corresponding to a stored query that is closest to the embedding vector corresponding to the summarized query. The category associated with the stored query that is most similar to the summarized query is determined to be the query category associated with the summarized query. The embedding model may determine this query category by computing a difference between embedding vectors corresponding to stored queries and the embedding vector corresponding to the summarized query. In some embodiments, the embedding model determines the category by computing a similarity value (e.g., cosine similarity) between embedding vectors corresponding to stored queries and the embedding vector corresponding to the summarized query.

Weights are assigned to document categories based on the determined category associated with the summarized query. Examples of different document categories include, but are not limited to: admin documents, API documents, technical documentation, knowledge based articles, customer support documents, competitive documents, policy documents, etc.

Document identifier 115 is configured to determine the best possible combination of documents to answer the query received from client device 102. Document identifier 115 has access to a plurality of document sources 132 that include publicly available documents and private documents (e.g., a company's internal documents). Document identifier 115 is configured to filter through a set of documents (public and/or private) to generate a subset of documents from which the best possible combination of documents to answer the query will be determined. In some embodiments, document(s) are filtered from the set of documents based on a corresponding category associated with the document(s). This filtering step reduces the amount of time to provide a query response since there are fewer documents for document identifier 115 to evaluate.

Document identifier 115 determines the best possible combination of documents to answer the query by providing to response generator 122 each possible combination of documents included in the set of documents (or filtered set of documents) and for each possible combination of documents, asking if response generator 122 is capable of generating a query response based on the summarized query and a particular combination of documents. Response generator 122 may be a public large language model, a private large language model, or a Hybrid large language model.

For each combination of documents provided to response generator 122, document identifier 115 scores each document in the set of documents based on whether response generator 122 outputs a positive response (e.g., yes) or a negative response (e.g., no). A document score is an aggregated score for the document for all possible combination of documents. The document score for a particular document increases when response generator 122 indicates it can answer the summarized query utilizing the particular document (either by the particular document by itself or in conjunction with one or more other documents). The document score for a particular document decreases when response generator 1221 indicates it cannot answer the summarized query utilizing the particular document (either by the particular document by itself or in conjunction with one or more other documents).

There are $2^n-1$ possible combinations of documents. For example, there may be 10 documents in the document set from which document identifier is evaluated. In this example, there are 1023 different possible combination of documents (e.g., document 1, document 1+document 2, document 1+document 2+document 3, . . . , document 2, document 2+document 3, . . . , document 10).

After each possible combination of documents is evaluated, document identifier 115 ranks the plurality of documents. The document rankings are adjusted by document identifier 115 based on the document category weights determined by query configurator 114. In some embodiments, the weight associated with a document increases the ranking of the document within the document ranking. In some embodiments, the weight associated with a document reduces the ranking of the document within the document ranking. In some embodiments, the weight associated with a document maintains a ranking of the document within the document ranking.

Document identifier determines from the set of documents a subset of documents that will be used to generate the query response. In some embodiments, a single document is selected (e.g., the top ranked document) for answering the query. This reduces the amount of time needed by response generator 122 to generate a query response and is preferred for applications where shorter response times are expected. In some embodiments, documents included in the subset have a score greater than or equal to a threshold score. In some embodiments, documents included in the subset have a ranking score above a ranking threshold (e.g., top ten). In some embodiments, documents included in the subset have a percentage ranking above a ranking percentage (e.g., top 5%). In some embodiments, utilizing a plurality of documents is preferred in use cases where time is not a constraint and highly accurate responses are expected. Query response system 112 may provide client device 102 an option to select a type of query response (e.g., fast or accurate with higher confidence). In response to a selection, query response system 112 provides the summarized query with a single document or a plurality of documents to response generator 122. The summarized query is utilized as a prompt and the single document or the plurality of documents is used as the context window for response generator 122.

Response generator 122 generates the query response based on the summarized query and the provided document (s) and provides the query response to query response system 112. Query response system 112 provides the query response to client device 102.

Figure 2:
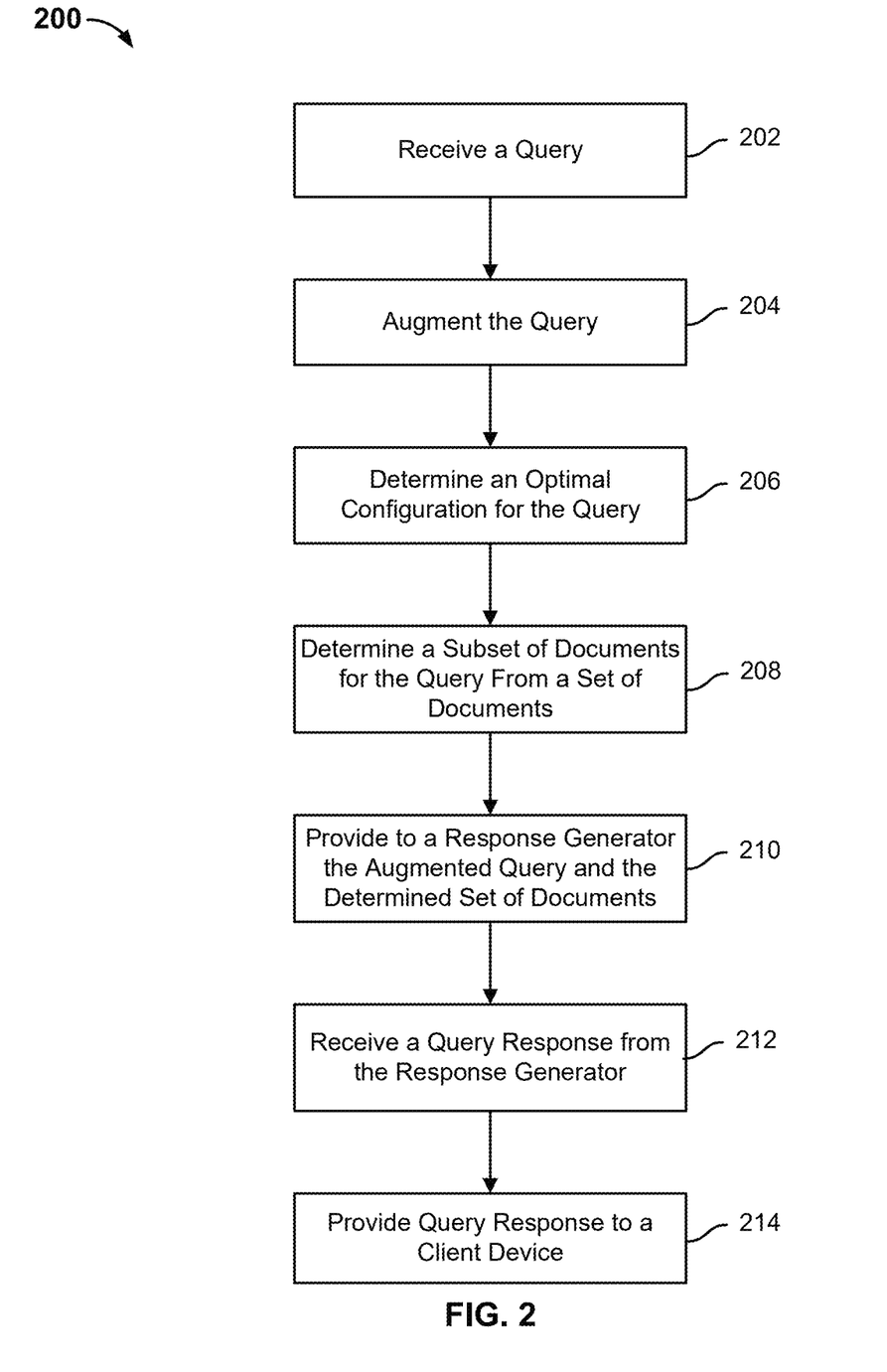
FIG. 2 is a flow diagram illustrating a process to generate a query response in accordance with some embodiments.

FIG. 2 is a flow diagram illustrating a process to generate a query response in accordance with some embodiments. In the example shown, process 200 may be implemented by a query response system, such as query response system 112.

At 202, a query is received from a client device. In some embodiments, the query includes sufficient details for a response generator to generate a query response. In some embodiments, the query includes insufficient details for a response generator to generate a query response.

At 204, the query is augmented. For a query that provides sufficient details, the query is summarized into a simple format. The query may be comprised of a long complex question. Summarizing the query into a simple format and utilizing the summarized query to generate the query response may yield a better query response when compared to performing the query with the long complex question.

For a query that provides insufficient details, one or more follow up questions are asked to obtain the sufficient details needed to answer the query. Information from the initial query and the one or more follow up question responses are utilized to generate a summarized query.

At 206, an optimal configuration for the query is determined. A category is determined for the summarized query (e.g., a type of question) from a plurality of known categories. Weights are assigned to documents based on the determined category associated with the summarized query.

For example, the different categories may include general product related, issue resolution, competitive, policy, and API usage. A general product related query may be associated with admin documents, technical documentation, and API documents. An issue resolution query may be associated with knowledge base articles and customer support documents. A competitive query may be associated with competitive documents. A policy query may be associated with policy documents. An API usage query may be associated with API documents.

For a general product related query, admin documents, technical documentation, and API documents may have a corresponding weight of 1.2, 1.5, and 1.1. For an issue resolution query, knowledge base articles and customer support documents may have a corresponding weight of 1.8 and 1.6. For a competitive query, competitive documents may have a corresponding weight of 2.5. For a policy query, policy documents may have a corresponding weight of 1.4. For an API usage query, API documents may have a corresponding weight of 1.7. Other documents not associated with the query category may maintain a weight of 1. In some embodiments, documents not associated with the query category have a weight less than 1.

At 208, a subset of documents for the query is determined from a set of documents. Documents included in the set of documents are scored. Each combination of the documents is provided to a response generator and the response generator is asked if it is capable of generating a query response given a particular combination of documents and the summarized query. In some embodiments, the response generator provides a positive response (e.g., yes). In some embodiments, the response generator provides a negative response (e.g., no). A document score for a document is an aggregated score for the document across all possible document combinations.

After each possible combination of documents is evaluated, the documents are ranked. In some embodiments, a live ranking is maintained and updated after a combination of documents is evaluated. The document rankings are adjusted based on the weights associated with a document category. In some embodiments, the weight associated with a document increases the ranking of the document within the document ranking. In some embodiments, the weight associated with a document reduces the ranking of the document within the document ranking. In some embodiments, the weight associated with a document maintains a ranking of the document within the document ranking.

The document identifier determines the subset of the plurality of documents that will be used to generate the query response. In some embodiments, a top ranked document is determined to be used to generate the query response. In some embodiments, the subset of documents includes at least two documents included in the set of documents. In some embodiments, the documents included in the subset have a ranking score greater than or equal to a threshold score. In some embodiments, the documents included in the subset have a ranking score above a ranking threshold (e.g., top ten). In some embodiments, the documents included in the subset have a percentage ranking above a ranking percentage (e.g., top 5%).

At 210, the augmented query and a subset of the plurality of documents is provided to a response generator. In some embodiments, the subset of the plurality of documents includes a single document from the plurality of documents. In some embodiments, the subset of the plurality of documents includes at least two documents.

At 212, a query response is received from the response generator.

At 214, the query response is provided to the client device.

Figure 3:
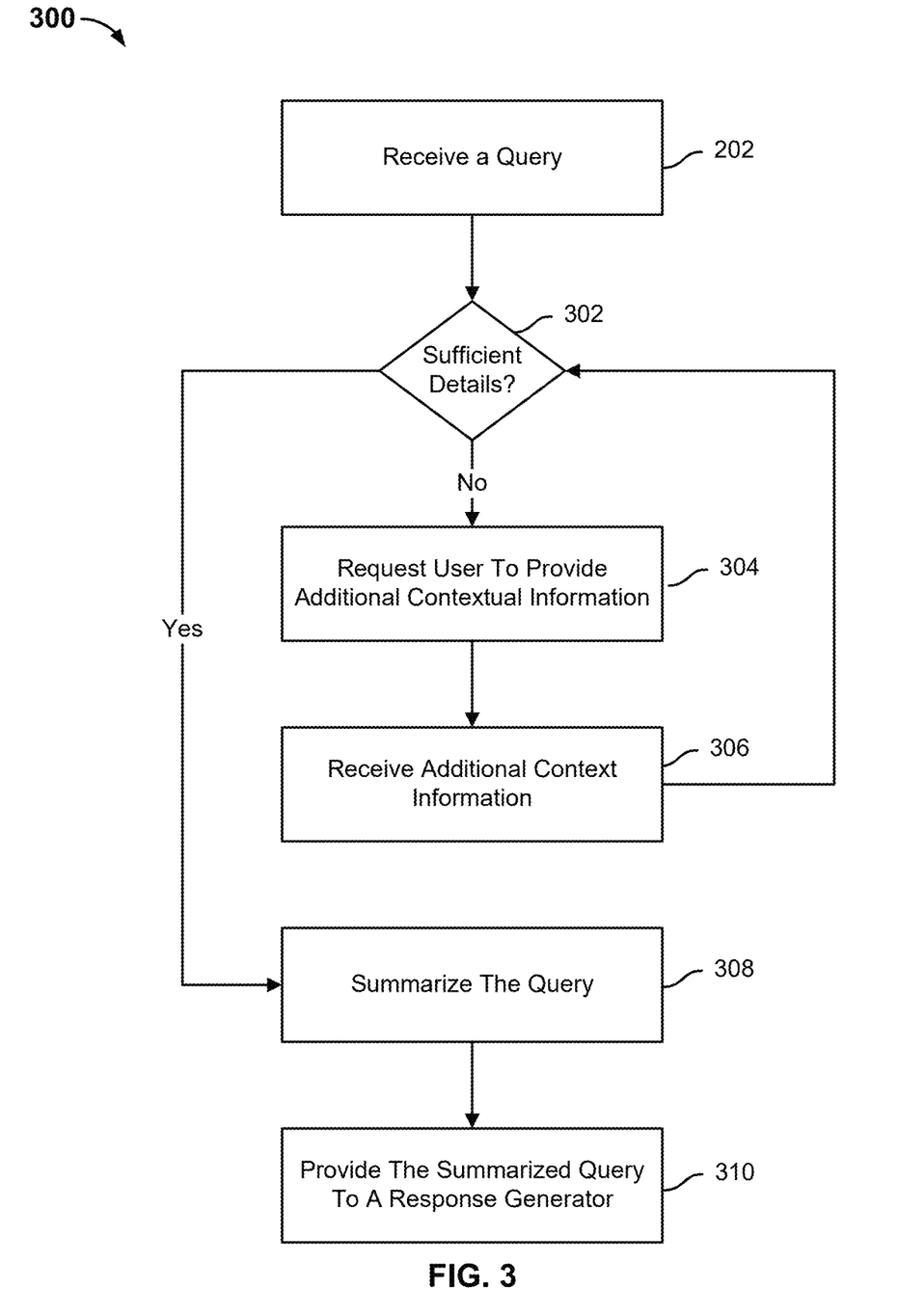
FIG. 3 is a flow diagram illustrating a process to augment a query in accordance with some embodiments.

FIG. 3 is a flow diagram illustrating a process to augment a query in accordance with some embodiments. In the example shown, process 300 is performed by a query response system, such as query response system 112. In some embodiments, process 300 is implemented to perform some or all of step 204 of process 200.

At 202, a query is received.

At 302, it is determined whether the query includes sufficient details for a response generator to answer the query. In response to a determination that the query includes sufficient details for the response generator to answer the query, process 300 proceeds to 308. In response to a determination that the query does not include sufficient details for the response generator to answer the query, process 300 proceeds to 304.

At 304, the user is requested to provided additional contextual information for the query. One or more follow up questions may be provided to obtain the additional contextual information for the query.

At 306, the additional contextual information is received.

At 308, the query is summarized. A query augmentor summarizes the query is into a simple format. The query may be comprised of a long complex question. Summarizing the query into a simple format and utilizing the summarized query to generate the query response may yield a better query response when compared to performing the query with the long complex question.

At 310, the summarized query is provided to a response generator.

Figure 4:
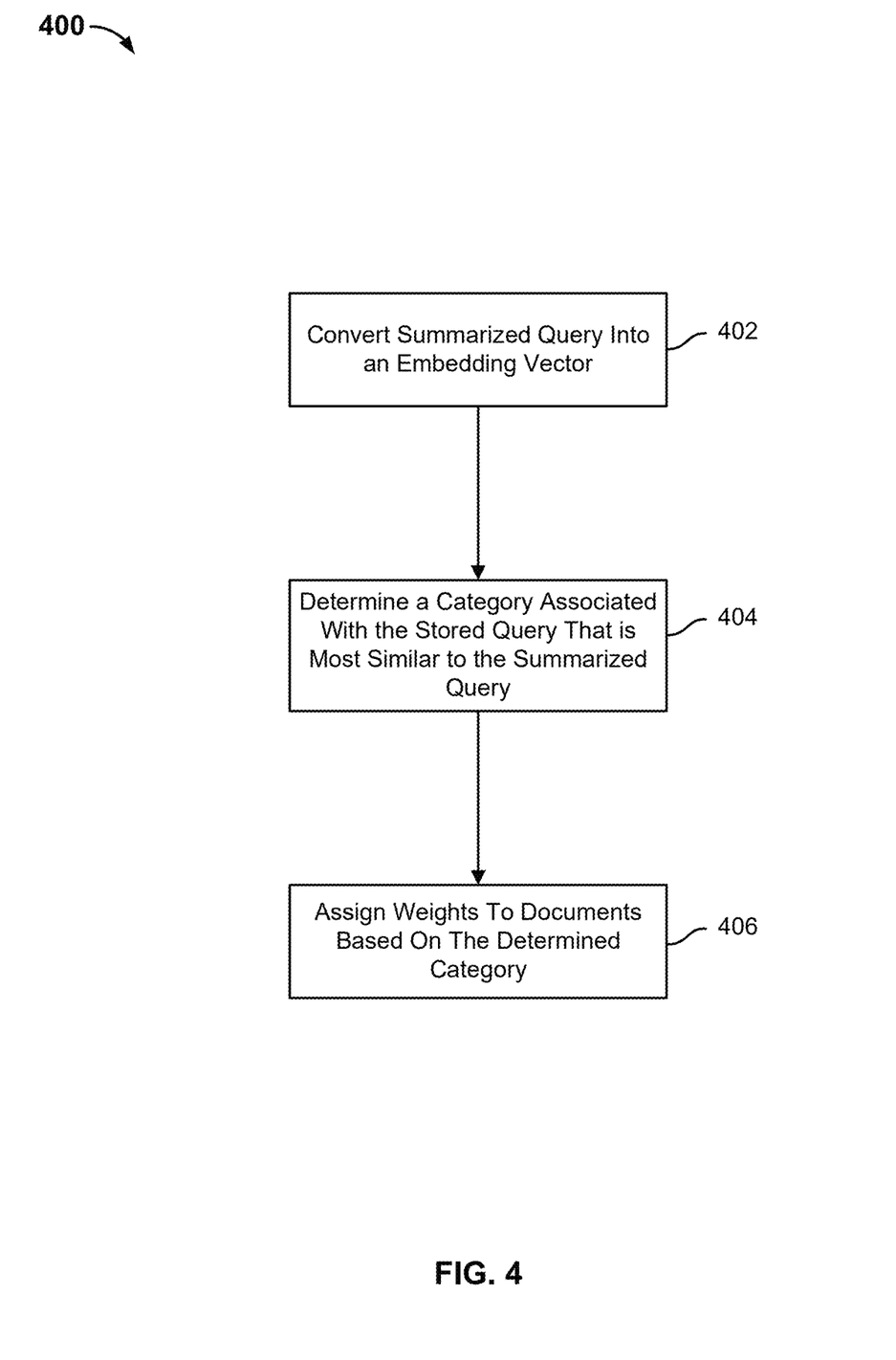
FIG. 4 is a flow diagram illustrating a process to determine an optimal configuration for a query in accordance with some embodiments.

FIG. 4 is a flow diagram illustrating a process to determine an optimal configuration for a query in accordance with some embodiments. In the example shown, process 400 is performed by a query response system, such as query response system 112. In some embodiments, process 400 is implemented to perform some or all of step 206 of process 200.

At 402, a summarized query is converted into an embedding vector. A natural language processor is utilized to generate the embedding vector.

At 404, a category associated with the stored query that is most similar to the summarized query is determined. The embedding vector is provided to a model. In some embodiments, the model is a large language model. In some embodiments, the model is an embedding model. Embedding vectors associated with a plurality of stored queries may be located in a plurality of different positions in the embedding space. In some embodiments, the embedding model is configured to determine a stored query that is most similar to the summarized query by determine an embedding vector corresponding to a stored query that is closest to the embedding vector corresponding to the summarized query. The category associated with the stored query that is most similar to the summarized query is determined to be the category associated with the summarized query. The embedding model may determine the category by computing a difference between embedding vectors corresponding to stored queries and the embedding vector corresponding to the summarized query. In some embodiments, the embedding model determines the category by computing a similarity value (e.g., cosine similarity) between embedding vectors corresponding to stored queries and the embedding vector corresponding to the summarized query.

At 406, weights are assigned to documents based on the determined category. For example, the different categories may include general product related, issue resolution, competitive, policy, and API usage. A general product related query may be associated with admin documents, technical documentation, and API documents. An issue resolution query may be associated with knowledge base articles and customer support documents. A competitive query may be associated with competitive documents. A policy query may be associated with policy documents. An API usage query may be associated with API documents.

For a general product related query, admin documents, technical documentation, and API documents may have a corresponding weight of 1.2, 1.5, and 1.1. For an issue resolution query, knowledge base articles and customer support documents may have a corresponding weight of 1.8 and 1.6. For a competitive query, competitive documents may have a corresponding weight of 2.5. For a policy query, policy documents may have a corresponding weight of 1.4. For an API usage query, API documents may have a corresponding weight of 1.7. Other documents not associated with the query category may maintain a weight of 1. In some embodiments, documents not associated with the query category have a weight less than 1. In some embodiments, certain documents not associated with the query category have a weight of 0.

Figure 5:
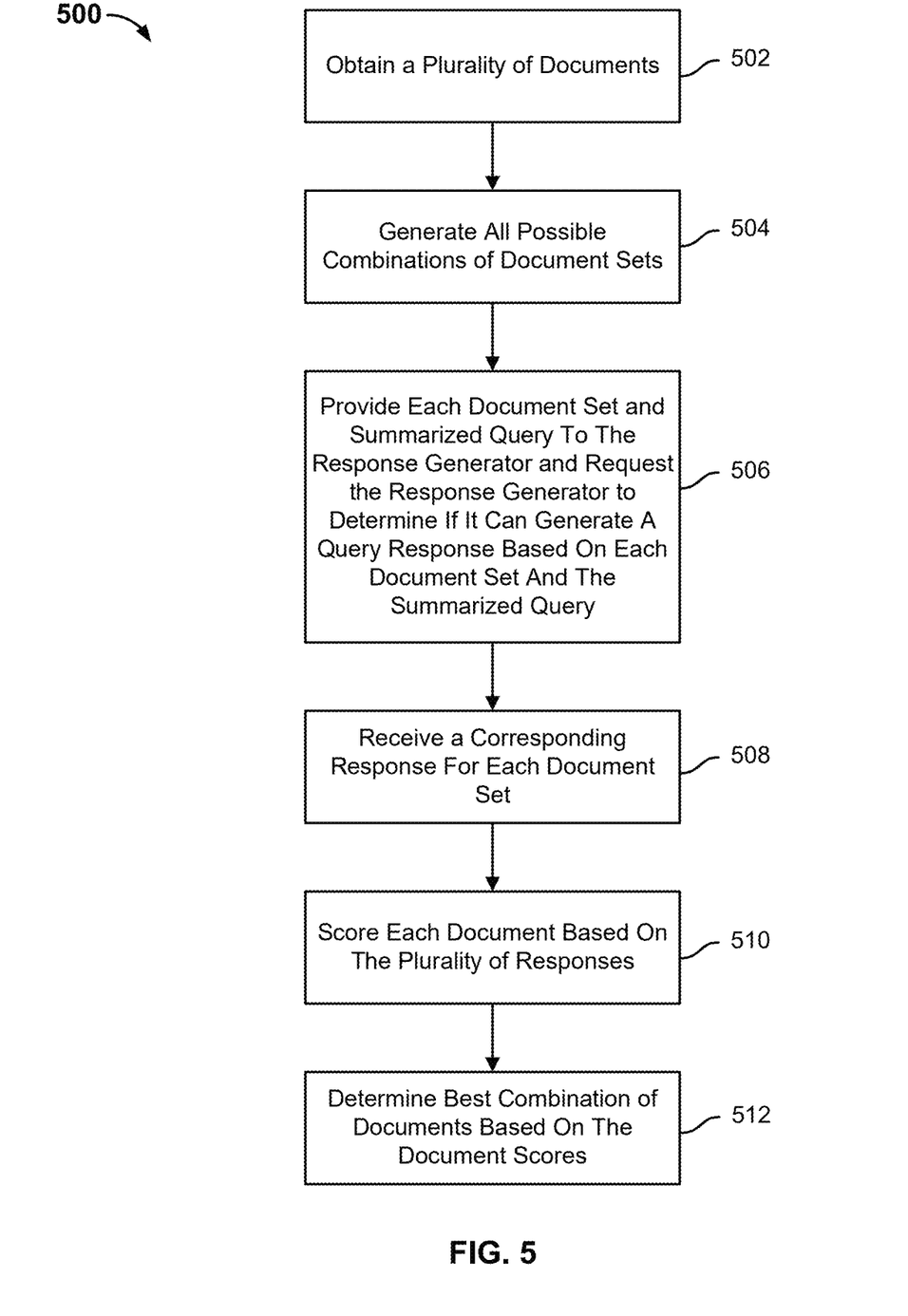
FIG. 5 is a flow diagram illustrating a process to determine a set of documents to be used to answer a query in accordance with some embodiments.

FIG. 5 is a flow diagram illustrating a process to determine a set of documents to be used to answer a query in accordance with some embodiments. In the example shown, process 500 is performed by a query response system, such as query response system 112. In some embodiments, process 500 is implemented to perform some or all of step 208 of process 200.

At 502, a plurality of documents is obtained. A document identifier may have access to one or more document sources that include publicly available documents and private documents (e.g., a company's internal documents).

The document identifier may filter through a plurality of documents (public and/or private) to generate a subset of documents from which the best possible combination of documents to answer the query will be determined. In some embodiments, documents associated with a category corresponding to a stored query may be filtered if the distance between an embedding vector corresponding to the stored query and the embedding vector corresponding to the summarized query is greater than a threshold filter distance. In some embodiments, documents associated with a category corresponding to a stored query may be filtered if the similarity between an embedding vector corresponding to the stored query and the embedding vector corresponding to the summarized query is less than a threshold similarity value (e.g., cosine similarity is less than 0.05). This filtering step reduces the amount of time to provide a query response since there are fewer documents for the document identifier to evaluate.

In some embodiments, the document identifier does not filter through the plurality of documents and all available documents are used to determine the best possible combination of documents to answer the query.

At 504, all possible combinations of document sets are generated. In some embodiments, the combination of document sets is generated for a filtered document set. In some embodiments, the combination of document sets is generated for a non-filtered document set. There are $2^n-1$ possible combinations of documents. For example, there may be 10 documents in the document set from which document identifier is evaluated. In this example, there are 1023 different possible combination of documents (e.g., document 1, document 1+document 2, document 1+document 2+document 3, ..., document 2, document 2+document 3, ..., document 10).

At 506, each document set and the summarized query is provided to a response generator and the response generator is requested to determine if it can generate a query response based on each document set and the summarized query.

At 508, a corresponding response is received for each document set. In some embodiments, the response generator provides a positive response indicating that a query response can be generated based on a particular document set and the query summary. In some embodiments, the response generator provides a negative response indicating that a query response cannot be generated based on a particular document set and the query summary.

At 510, each document in the plurality of documents is scored based on the plurality of responses received the response generator. In some embodiments, a document score increases based on the response generator's response (e.g., a query response can be generated using the document by itself or in conjunction with one or more other documents). In some embodiments, a document score decreases based on the response generator's response (e.g., a query response cannot be generated using the document by itself or in conjunction with one or more other documents). A document score does not increase or decrease if it was not included in a document set provided to the response generator.

At 512, a best combination of documents is determined based on the document scores. After each possible combination of documents is evaluated, the plurality of documents is ranked. The document rankings may be adjusted based on the document category weights. In some embodiments, the weight associated with a document increases a ranking of the document within the document ranking. In some embodiments, the weight associated with a document reduces a ranking of the document within the document ranking. In some embodiments, the weight associated with a document maintains a ranking of the document within the document ranking.

In some embodiments, the best combination of documents includes the top ranked document. In some embodiments, the best combination of documents includes at least two of the top ranked documents. In some embodiments, documents included in the subset have a ranking score greater than or equal to a threshold score. In some embodiments, documents included in the subset having a ranking score above a ranking threshold (e.g., top ten). In some embodiments, documents included in the subset have a percentage ranking above a ranking percentage (e.g., top 5%).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
 receiving a query from a client device;
 determining that the query includes insufficient details for a response generator to generate a query response, wherein the query includes insufficient details when the response generator determines that a relevant document cannot be retrieved to answer the query;
augmenting the query to generate an augmented query that includes sufficient details for the response generator to generate the query response, wherein augmenting the query includes sending to the client device one or more follow up questions;
summarizing the augmented query into a summarized query;
determining a subset of documents relevant to the query in part by determining an optimal configuration for the query, wherein determining the optimal configuration for the query includes classifying the summarized query that is based on the query into a first query category of a plurality of known query categories, wherein classifying the summarized query includes:
converting the summarized query into an embedding vector including by utilizing a natural language processor to generate the embedding vector;
providing the embedding vector to an embedding model;
determining, using the embedding model, a stored query that is most similar to the summarized query including by determining an embedding vector corresponding to a stored query that is closest to the embedding vector corresponding to the summarized query in an embedding space from a plurality of embedding vectors corresponding to a plurality of stored queries located in a plurality of different positions in the embedding space; and
determining a category associated with the stored query that is most similar to the summarized query to be the first query category including by computing one or more similarity values between the plurality of vectors corresponding to the plurality of stored queries and the embedding vector corresponding to the summarized query;
inputting the subset of documents in a context window for the response generator and the query as a prompt for the query response; and
outputting to the client device the query response received from the response generator.

2. The method of claim 1, wherein classifying the summarized query further includes assigning corresponding weights to the subset of documents based on the first query category.

3. The method of claim 1, wherein determining the subset of documents relevant to the query includes generating a plurality of different documents sets for a set of the documents.

4. The method of claim 3, wherein determining the subset of documents relevant to the query includes providing to the response generator a summarized query and each document set of the plurality of different document sets.

5. The method of claim 4, wherein determining the subset of documents relevant to the query further includes generating a corresponding score for each document included in the set of the documents.

6. The method of claim 5, wherein the corresponding score for a first document included in the set of documents increases in response to receiving from the response generator a positive response indicating that the response generator has determined that it can generate the query response utilizing the first document.

7. The method of claim 6, wherein the response generator has determined that it can generate the query response utilizing the first document by itself.

8. The method of claim 6, wherein the response generator has determined that it can generate the query response utilizing the first document in conjunction with one or more other documents included in the set of the documents.

9. The method of claim 5, wherein the corresponding score for a first document included in the set of documents decreases in response to receiving from the response generator a positive response indicating that the response generator has determined that it cannot generate the query response utilizing the first document.

10. The method of claim 9, wherein the response generator has determined that it cannot generate the query response utilizing the first document by itself.

11. The method of claim 9, wherein the response generator has determined that it cannot generate the query response utilizing the first document in conjunction with one or more other documents included in the set of the documents.

12. The method of claim 5, wherein the corresponding score for each document included in the set of the documents is an aggregate score.

13. The method of claim 5, wherein the subset of documents includes a document having a top score among documents included in the set of documents.

14. The method of claim 5, wherein the subset of documents include at least two documents.

15. The method of claim 14, wherein the at least two documents have a corresponding score above a threshold score, a corresponding ranking score above a ranking threshold, or a corresponding percentage ranking above a ranking percentage.

16. A system, comprising:
a processor configured to:
receive a query from a client device;
determine that the query includes insufficient details for a response generator to generate a query response, wherein the query includes insufficient details when the response generator determines that a relevant document cannot be retrieved to answer the query;
augment the query to generate an augmented query that includes sufficient details for the response generator to generate the query response, wherein augmenting the query includes sending to the client device one or more follow up questions;
summarize the augmented query into a summarized query;
determine a subset of documents relevant to the query in part by determining an optimal configuration for the query, wherein determining the optimal configuration for the query includes classifying a summarized query that is based on the query into a first query category of a plurality of known query categories, wherein classifying the summarized query includes:
converting the summarized query into an embedding vector including by utilizing a natural language processor to generate the embedding vector;
providing the embedding vector to an embedding model;
determining, using the embedding model, a stored query that is most similar to the summarized query including by determining an embedding vector corresponding to a stored query that is closest to the embedding vector corresponding to the summarized query in an embedding space from a plurality of embedding vectors corresponding to a plurality of stored queries located in a plurality of different positions in the embedding space; and determining a category associated with the stored query that is most similar to the summarized query to be the first query category including by computing one or more similarity values between the plurality of vectors corresponding to the plurality of stored queries and the embedding vector corresponding to the summarized query;

input the subset of documents in a context window for the response generator and the query as a prompt for the query response;

output to the client device the query response received from the response generator; and a memory coupled to the processor and configured to provide the processor with instructions.

17. A computer program product embodied in a non-transitory computer readable medium and comprising computer instructions for:

receiving a query from a client device;

determining that the query includes insufficient details for a response generator to generate a query response, wherein the query includes insufficient details when the response generator determines that a relevant document cannot be retrieved to answer the query;

augmenting the query to generate an augmented query that includes sufficient details for the response generator to generate the query response, wherein augmenting the query includes sending to the client device one or more follow up questions;

summarizing the augmented query into a summarized query;

determining a subset of documents relevant to the query in part by determining an optimal configuration for the query, wherein determining the optimal configuration for the query includes classifying a summarized query that is based on the query into a first query category of a plurality of known query categories, wherein classifying the summarized query includes:

converting the summarized query into an embedding vector including by utilizing a natural language processor to generate the embedding vector;

providing the embedding vector to an embedding model;

determining, using the embedding model, a stored query that is most similar to the summarized query including by determining an embedding vector corresponding to a stored query that is closest to the embedding vector corresponding to the summarized query in an embedding space from a plurality of embedding vectors corresponding to a plurality of stored queries located in a plurality of different positions in the embedding space; and determining a category associated with the stored query that is most similar to the summarized query to be the first query category including by computing one or more similarity values between the plurality of vectors corresponding to the plurality of stored queries and the embedding vector corresponding to the summarized query;

inputting the subset of documents in a context window for the response generator and the query as a prompt for the query response; and outputting to the client device the query response received from the response generator.

* * * * *